United States Patent
Franco et al.

(10) Patent No.: US 12,509,738 B2
(45) Date of Patent: Dec. 30, 2025

(54) METHOD AND CORRESPONDING APPARATUS FOR PRODUCING IRON FROM DIRECT REDUCTION OF IRON ORE

(71) Applicants: Danieli & C. Officine Meccaniche S.p.A., Buttrio (IT); HyL Technologies, S.A. de C.V., San Nicolas de los Garza (MX)

(72) Inventors: Barbara Franco, Bagnaria Arsa (IT); Paolo Roman Di Catterina, Maniago (IT); Jorge Eugenio Martinez Miramontes, General Escobedo-Nuevo León (MX)

(73) Assignees: DANIELI & C. OFFICINE MECCANICHE S.P.A., Buttrio (IT); HYL TECHNOLOGIES, S.A. DE C.V., Nicolas de los Garza (MX)

( * ) Notice: Subject to any disclaimer, the term of this patent is extended or adjusted under 35 U.S.C. 154(b) by 751 days.

(21) Appl. No.: 17/776,666

(22) PCT Filed: Nov. 10, 2020

(86) PCT No.: PCT/EP2020/081671
§ 371 (c)(1),
(2) Date: May 13, 2022

(87) PCT Pub. No.: WO2021/094328
PCT Pub. Date: May 20, 2021

(65) Prior Publication Data
US 2022/0396843 A1 Dec. 15, 2022

(30) Foreign Application Priority Data
Nov. 14, 2019 (IT) .......................... 102019000021228

(51) Int. Cl.
*C21B 13/00* (2006.01)
*C21B 13/02* (2006.01)

(52) U.S. Cl.
CPC ........ *C21B 13/004* (2013.01); *C21B 13/0073* (2013.01); *C21B 13/02* (2013.01); *C21B 2100/64* (2017.05)

(58) Field of Classification Search
CPC ... C21B 13/004; C21B 13/0073; C21B 13/02; C21B 2100/64
See application file for complete search history.

(56) References Cited

U.S. PATENT DOCUMENTS

| | | | |
|---|---|---|---|
| 2001/0003930 A1 | 6/2001 | Montague et al. | |
| 2016/0017445 A1* | 1/2016 | Cheeley | C01B 3/50 75/493 |
| 2021/0032712 A1* | 2/2021 | Condosta | C21B 13/0073 |

FOREIGN PATENT DOCUMENTS

| | | | |
|---|---|---|---|
| DE | 4030093 A1 | 3/1992 | |
| DE | 19653326 A1 * | 6/1998 | ......... C21B 13/0073 |

(Continued)

OTHER PUBLICATIONS

Wang Taiyan et.al. [CN103667573A] (machine translation) (Year: 2014).*

(Continued)

*Primary Examiner* — Sally A Merkling
*Assistant Examiner* — Nazmun Nahar Shams
(74) *Attorney, Agent, or Firm* — Panitch Schwarze Belisario & Nadel LLP

(57) ABSTRACT

A method for producing direct reduced iron is provided. The method includes circulating a first stream of spent reducing gas exiting a reactor in a reducing gas circuit through at least one carbon dioxide removal unit and a reducing gas heater and the reactor. The method also includes mixing the first (Continued)

stream with reducing gas containing heavier hydrocarbons than methane.

12 Claims, 1 Drawing Sheet

(56) References Cited

FOREIGN PATENT DOCUMENTS

WO     2016/203396 A1    12/2016
WO     2018/024767 A1     2/2018

OTHER PUBLICATIONS

Rose Fritz [DE19653326A1] (machine translation) (Year: 1998).*
Int'l Search Report and Written Opinion issued Nov. 22, 2021 in Int'l Application No. PCT/EP2020/081671.

* cited by examiner

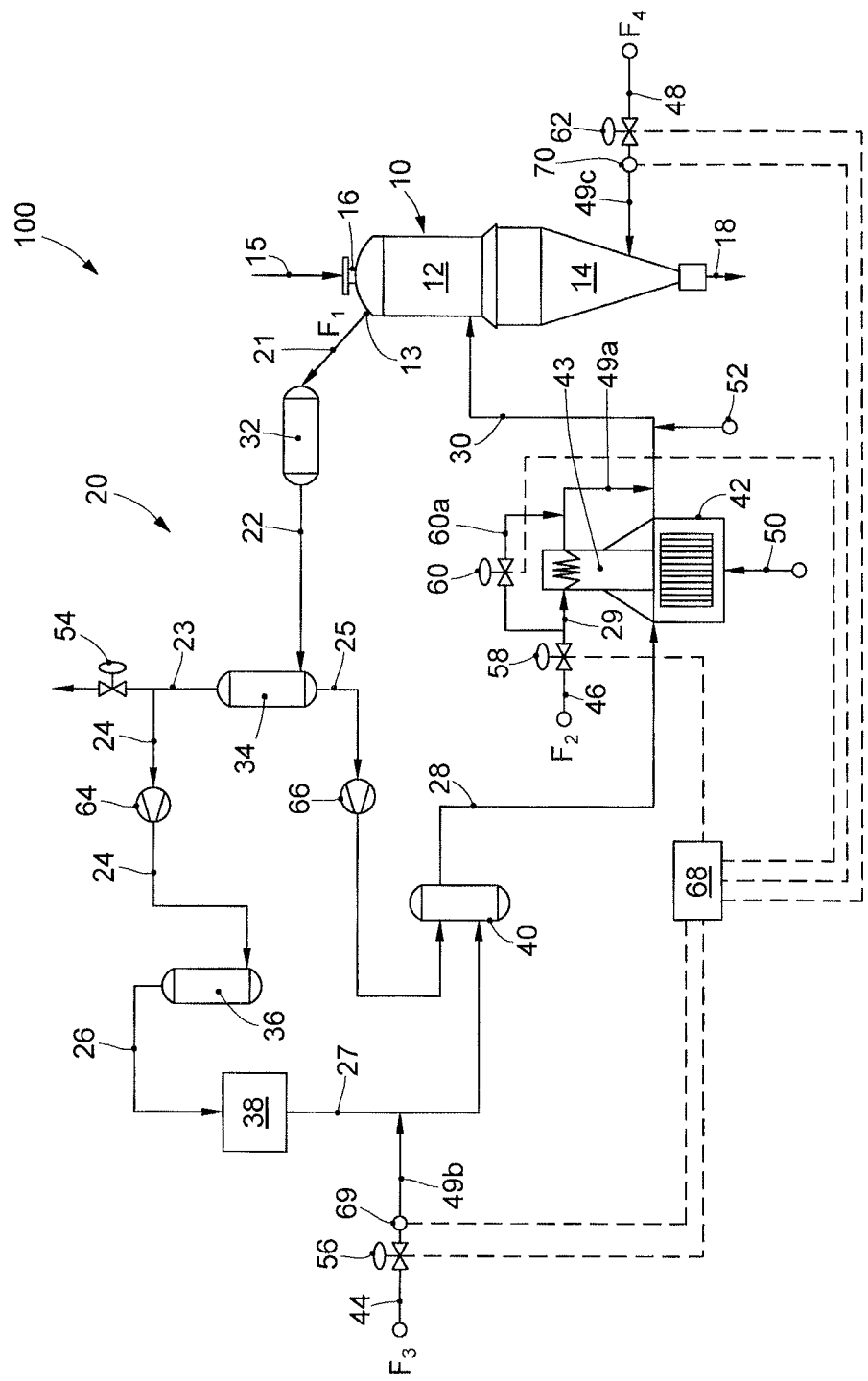

METHOD AND CORRESPONDING APPARATUS FOR PRODUCING IRON FROM DIRECT REDUCTION OF IRON ORE

CROSS-REFERENCE TO RELATED APPLICATIONS

This application is a Section 371 of International Application No. PCT/EP2020/081671, filed Nov. 10, 2020, which was published in the English language on May 20, 2021, under International Publication No. WO 2021/094328 A1, which claims priority under 35 U.S.C. § 119 (b) to Italian Application No. 102019000021228, filed Nov. 14, 2019, the disclosures of each of which are incorporated herein by reference.

FIELD OF THE INVENTION

The present invention concerns a method and corresponding apparatus for producing metallic iron by means of direct reduction of iron ore, using a reducing gas produced from a hydrocarbon source having carbon compounds heavier than methane with limited formation of carbon residues.

BACKGROUND OF THE INVENTION

It is known that, in the steel industry, one of the most widely used processes for producing metallic iron is the direct reduction of iron ore (Direct Reduced Iron, DRI). This DR (Direct Reduction) process is advantageous in particular due to its low environmental impact and high efficiency.

The DR process provides to make the iron ore react with a stream of reducing gas in a suitable reduction reactor.

The reducing gas mainly comprises hydrogen ($H_2$) and carbon monoxide (CO) by means of which the oxygen is in fact removed from the iron ore by means of a high temperature chemical reduction (700° C.-1000° C.) as indicated by the following formulae:

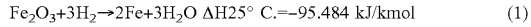

$Fe_2O_3+3H_2\rightarrow 2Fe+3H_2O$ $\Delta H25°$ C.=−95.484 kJ/kmol (1)

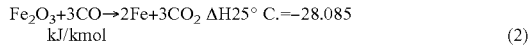

$Fe_2O_3+3CO\rightarrow 2Fe+3CO_2$ $\Delta H25°$ C.=−28.085 kJ/kmol (2)

Usually, the reducing gas used in these processes is produced from a mixture of a fresh reducing gas, that is $CH_4$ and heavy hydrocarbons high content gas introduced from outside and spent reducing gas that exits the reactor after the reduction process.

The spent reducing gas can be reused in new reducing operations, after treating said gas in order to restore its reducing characteristics and possibly mix it with fresh reducing gas, for example, natural gas or Coke Oven Gas (COG) or other synthetic gases with high content of $CH_4$ and heavy hydrocarbons.

Natural gas, the main source of reducing gas in DRI processes, comprises, in varying proportions, hydrocarbons such as methane ($CH_4$) and ethane ($C_2H_6$) and possibly other longer chain hydrocarbons (C2+), that is heavier, such as propane ($C_3H_8$), butane ($C_4H_{10}$) etc. in variable proportions.

COG which is produced by pyrolysis of coal, has a high proportion of carbon compounds such as Benzene, Toluene and Xylene, known as BTX, and other complex carbon compounds and can also be used as source of reducing gas.

Before being put into contact with the iron ore inside the reactor, the reducing gas coming from any gas source with high content of $CH_4$ and heavy hydrocarbons (mixed with the recirculated spent reducing gas) is generally heated to increase its temperature to a value comprised between 700° C. and 1100° C. in a gas heater. The reducing gas must be heated to such a high temperature to provide heat to the iron oxides material inside the shaft furnace so as to maintain adequate temperature conditions for the kinetics of the reduction reactions to be within the required value corresponding to the DRI production rate of the furnace.

It is known that, when the C2+ hydrocarbon content is not negligible, during the heating the undesired breaking of the chains of the hydrocarbons, and the consequent deposit of solid carbon inside the heater, occur.

One disadvantage, therefore, is the need to periodically perform long cleaning operations of the heater to remove the carbon deposits.

Another disadvantage is the interruption of production during the cleaning operations of the heater to remove the carbon deposits, causing an economic loss.

Another disadvantage is that frequent thermal cycles of the heater, determined by the need to carry out the cleaning cycles, can lead to a premature deterioration thereof.

It is also known to use devices to remove, at least partially, the fraction of heavier hydrocarbons from the reducing gas, such as, for example, the so-called "reformers".

One disadvantage of these devices is that they increase the capital expenditure (CAPEX) of the apparatus.

Another disadvantage is that devices such as the external reformers make the reducing apparatus more complex.

US 2001/0003930 A1 discloses method and apparatus for increasing the productivity of a direct reduction process in which iron oxide is reduced to metallized iron by contact with hot reducing gas; comprising the steps of: a) providing a first hot reducing gas consisting essentially of CO and $H_2$; b) providing additional reducing gas by reaction of a gaseous or liquid hydrocarbon fuel with oxygen; c) mixing the first hot reducing gas with the additional reducing gas to form a reducing gas mixture; d) enriching the reducing gas mixture by the addition of a gaseous or liquid hydrocarbon; e) injecting oxygen or oxygen-enriched air into the enriched mixture; and f) introducing the enriched mixture into an associated direct reduction furnace as reducing gas. However, this document is completely silent regarding the deposit of solid carbon inside the heater due to the fraction of heavier hydrocarbons present in the natural gas.

WO 2016/203396 A1 discloses natural gas mixtures enriched with heavier hydrocarbons to improve the heating values to obtain a reducing gas stream that is then subjected to a reformer. This document as well does not face the problems regarding the deposit of solid carbon inside the heater due to the fraction of heavier hydrocarbons present in the natural gas.

DE 40 30 093 A1 discloses a process for the direct reduction of granular iron ore in a furnace with a hydrogen and carbon monoxide-containing reducing gas, which is produced from a methane-rich gas over an indirectly heated catalyst at temperatures of 800 to 1200° C., wherein top gas is withdrawn from the furnace and at least partly used as fuel for indirect heating of the catalyst. This document discloses that a natural gas is supplied to the heat exchange zone, the ethane content of which is at least 25% by volume and which contains 0.5 to 5% by volume of propane and 0.1 to 5% by volume of butane and higher hydrocarbons. If such natural gas together with water vapor and/or $CO_2$ is passed through the catalyst, which is indirectly heated in the tube furnace, after sufficient heating, soot deposits lead to the rapid deactivation of the catalyst. This document aims at suppressing as far as possible the disturbing soot formation in order to achieve a long service life of the catalyst, however this is achieved via a specific treatment to remove heavier hydrocarbons present in the natural gas.

WO 2018/024767 discloses a method and apparatus for producing direct reduced iron utilizing a catalytical pre-treatment of hydrocarbons as a source of reducing gas. This document teaches how to obviate to the presence of heavier hydrocarbons present in the natural gas by treating the natural gas in a pre-reforming section, before being supplied.

There is therefore a need to perfect a method and an apparatus for producing DRI from direct reduction of iron ore that can overcome at least one of the disadvantages of the state of the art.

In particular, one purpose of the present invention is to provide a method and corresponding apparatus for direct reduction of iron ore utilizing reducing gas having a high content of hydrocarbons heavier than methane (>4%) which is able to produce DRI limiting the formation of carbon deposits in the heater.

Another purpose of the present invention is to provide a method and an apparatus for direct reduction of iron ore that is efficient and contains investment costs.

The Applicant has devised, tested and embodied the present invention to overcome the shortcomings of the state of the art and to obtain these and other purposes and advantages, solving the technical problem of limiting the amount of hydrocarbons heavier than methane or complex carbon compounds passing through the reducing gas heater of a DR apparatus and thus decreasing the amount of carbon deposits that may form therein, while at the same time maintaining the temperature of the reducing gas and iron oxides in the shaft furnace to give the desired production rate of DRI.

SUMMARY OF THE INVENTION

The present invention is set forth and characterized in the independent claims, while the dependent claims describe other characteristics of the invention or variants to the main inventive idea.

Embodiments described here concern a method for producing DRI in a direct reduction process using reducing gas chosen among a natural gas having a high content of total hydrocarbons heavier than methane (>4%), or coke oven gas (COG) having complex carbon compounds (BTX) or other synthetic gases coming from any source with high content of $CH_4$ and heavy hydrocarbons.

According to one embodiment, the method comprises circulating a first stream of reducing gas exiting a reactor in a reducing gas circuit through at least one carbon dioxide removal unit, a reducing gas heater and a reactor.

The method further provides to feed into the reducing gas circuit between the reducing gas heater and the reduction reactor, a stream of fresh reducing gas which amounts to more than 20% of the overall quantity of reducing gas sent to the reduction reactor and thus needed to operate the direct reduction process.

The remaining part not fed in this position is instead injected according to the classic method between the carbon dioxide removal unit and the reducing gas heater.

The present description also concerns an apparatus for producing iron from direct reduction of iron ore using a reducing gas having a high content of total hydrocarbons heavier than methane (>4%), chosen among a natural gas having a high content of hydrocarbons heavier than methane, or coke oven gas (COG) having complex carbon compounds (BTX) or other synthetic gases coming from any source with high content of $CH_4$ and heavy hydrocarbons. According to one embodiment, the apparatus comprises a reduction reactor, a carbon dioxide removal unit and a heater, a reducing gas circuit being provided which passes through the carbon dioxide removal unit and the heater and the reactor.

According to one embodiment, the apparatus comprises first injection means configured to feed, into the reducing gas circuit between the reducing gas heater and the reduction reactor, a stream of fresh reducing gas which amounts to more than 20% of the quantity of reducing gas needed to operate the direct reduction process, while maintaining the total amount of energy necessary to carry out the reduction reactions in the reactor according to the programmed production rate. As this energy for the reduction reactions is provided by the sensible heat of the reducing gas stream fed to the reactor, and this heat is supplied to the reducing gas in the heater, it may be necessary to preheat said stream of reducing gas in a separate heater up to a temperature below 650° C. to avoid carbon deposits in this separate heater.

In some embodiments, the method and apparatus described here advantageously provide to recover and regenerate the reducing gas, waste of the reduction reaction, without the addition of further apparatuses such as, for example, an external reformer.

Advantageously, the method does not comprise any step of removal of the fraction of heavier hydrocarbons from the reducing gas, in particular it does not comprise any reforming step. Further, the apparatus described herein does not comprise any means or device for removal of the fraction of heavier hydrocarbons from the reducing gas, in particular it does not include any reformer.

According to some embodiments, the spent reducing gas exiting the reactor can enter the reducing gas circuit after suitable regeneration and be re-introduced into the reactor.

With the term "regenerate" we mean the set of processes, performed by regeneration devices, suitable to at least partly restore the reducing properties of a reducing gas.

Furthermore, some embodiments provide that the spent reducing gas can be mixed with reducing gas before being injected into the reactor and/or mixed directly inside the reactor.

In accordance with possible embodiments, the reducing gas circuit of the reduction apparatus described here comprises at least one carbon dioxide removal unit suitable to remove the $CO_2$ from the reducing gas.

In accordance with possible embodiments, the method also provides to inject a greater volume, with respect to the state of the art, of reducing gas inside the circuit to be mixed with the spent reducing gas, in order to promote the reforming reactions directly inside the reduction reactor.

Preferably, this greater volume of reducing gas is injected in a point of the reducing gas circuit downstream of the heater.

Advantageously, in this way the long chain hydrocarbons (C2+) possibly present in the fresh reducing gas, such as natural gas, COG, or other synthetic gases coming from any source with high content of $CH_4$ and heavy hydrocarbons, do not come into contact with the elements of the heater, avoiding the deposit of carbon inside it.

In this way, even the use of reducing gas possibly with a high percentage of long chain hydrocarbons (C2+), that is the use of natural gas or the use of COG containing BTX or the use of other synthetic gases coming from any source with high content of $CH_4$ and heavy hydrocarbons is made possible without the risk of formation of carbon deposits in the heater.

According to the method and apparatus of the present disclosure, the presence of heavier hydrocarbons present in the natural gas leading to deposit of solid carbon inside the heater is solved without any specific treatment or pre-treatment of the natural gas, as in the case of the known prior art, but on the contrary advantageously supplying the natural gas in a specific zone where the presence of heavier hydrocarbons in the natural gas is not dangerous, in particular feeding the stream of fresh reducing gas, which amounts to more than 20% of the quantity of reducing gas needed to operate the direct reduction process, into the reducing gas circuit between the reducing gas heater and the reduction reactor.

BRIEF DESCRIPTION OF THE DRAWINGS

These and other characteristics of the present invention will become apparent from the following description of some embodiments, given as a non-restrictive example with reference to the attached drawings wherein:

FIG. 1 is a schematic representation of an apparatus for implementing a method according to the embodiments described here.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described here concern a method for producing DRI in a direct reduction process using a reducing gas chosen among a natural gas having a high content of total hydrocarbons heavier than methane (>4%), or coke oven gas (COG) having complex carbon compounds (BTX) or other synthetic gases coming from any source with high content of $CH_4$ and heavy hydrocarbons. It is understood that by hydrocarbons heavier than methane we mean the sum off all hydrocarbons with two or more carbon atoms (C2+). Possible examples are ethane ($C_2H_6$), propane ($C_3H_8$), butane ($C_4H_{10}$) or higher. Thus, the expression "high content of total hydrocarbons heavier than methane" as used in the embodiments described herein means that the sum off all hydrocarbons with two or more carbon atoms (C2+) is more than 4%.

The method can be favourably implemented by means of an apparatus 100 for example as shown in FIG. 1.

The method according to the present description comprises circulating a first stream F1 of reducing gas exiting from a reduction reactor 10 in a reducing gas circuit 20 through at least one carbon dioxide removal unit 38 and a reducing gas heater 42 and a reactor 10.

According to one aspect of the invention, the method provides to feed, into the reducing gas circuit 20 between the reducing gas heater 42 and the reduction reactor 10, a stream F2 of fresh reducing gas which amounts to more than 20% of the overall quantity of reducing gas sent to the reactor 10 and thus needed to operate the direct reduction process.

In possible implementations, the stream F2 of said reducing gas amounts to more than 25%, or 30%, or 35%, or 40%, or 45%, or 50%, or 55%, or 60%, or 65%, or 70%, or 75%, or 80%, or 85%, or 90%, or 95%, of the quantity of the reducing gas needed to operate the direct reduction process.

In accordance with some embodiments, the method can provide that the stream F2 of gas is pre-heated to a temperature below 650° C.

According to some embodiments, the pre-heating of the stream F2 can occur in a convective zone 43 of the reducing gas heater 42.

In other embodiments, the stream F2 can be pre-heated in a heat exchanger or fired heater separate from the reducing gas heater 42.

In further embodiments, the stream F2 can be injected into the reducing gas circuit 20 without being pre-heated.

According to some embodiments, the method can provide to feed at least one other streams F3, F4 of fresh reducing gas, which amounts to the portion of reducing gas not injected into the reducing gas circuit 20 by the stream F2.

In a possible embodiment, the stream F3 can be injected in correspondence with any portion whatsoever of the reducing gas circuit 20 located between the carbon dioxide removal unit 38 and the reducing gas heater 42.

In another possible embodiment, the stream F4 can be injected directly into the reactor 10.

In another possible embodiment, it is conceivable to perform a combined feed of reducing gas which amounts to the portion of reducing gas not injected into the reducing gas circuit 20 by the stream F2, formed by the stream F3 injected in correspondence with any portion whatsoever of the reducing gas circuit 20, located between the carbon dioxide removal unit 38 and the reducing gas heater 42, and by the stream F4 injected directly into the reactor 10.

Some embodiments can also provide that at least the second stream F2, and possibly one and/or the other of the streams F3, F4, are controlled by at least one control unit 68 of the apparatus 100, configured to regulate the flow rate and therefore the percentage of reducing gas injected into the reducing gas circuit 20.

According to embodiments, the control unit 68 may regulate the flow rate of the gas stream F2 in response to a signal emitted by a flow rate sensor 69 and/or 70 measuring the flow rate of gas stream F3 and/or F4.

In other embodiments, control unit 68 additionally to regulating the flow rate of gas stream F2 also may regulate the flow rate of gas stream F3 and/or F4.

In other embodiments, not shown here, each stream F2, F3, F4 can be controlled by a respective and dedicated control unit, which can be connected to each other.

In some embodiments the control unit 68 may also regulate a flow rate of oxygen 52 with the aim of compensating the loss of energy caused by the fact that gas stream F2 bypassing the fired heater 42 will not have in any case the same temperature of the pipe 28 after heating in same fired heater 42.

FIG. 1 is used to describe embodiments of an apparatus 100 for producing iron from direct reduction of iron ore using reducing gas having a high content of total hydrocarbons heavier than methane (>4%), chosen among a natural gas having a high content of hydrocarbons heavier than methane, or coke oven gas (COG) having complex carbon compounds (BTX) or other synthetic gases coming from any source with high content of $CH_4$ and heavy hydrocarbons.

According to one embodiment, the apparatus 100 comprises a reduction reactor 10, the carbon dioxide removal unit 38 and the heater 42. The apparatus 100 comprises the reducing gas circuit 20 which passes through the carbon dioxide removal unit 38 and the heater 42 and the reactor 10. According to one embodiment, the apparatus 100 comprises first injection means 49a configured to feed, into the reducing gas circuit 20 between the reducing gas heater 42 and the reduction reactor 10, the stream F2 of fresh reducing gas which amounts to more than 20% of the quantity of reducing gas needed to operate the direct reduction process.

In possible implementations, the first injection means 49a are configured to feed the stream F2 of fresh reducing gas which amounts to more than 25%, or 30%, or 35%, or 40%, or 45%, or 50%, or 55%, or 60%, or 65%, or 70%, or 75%, or 80%, or 85%, or 90%, or 95%, of the amount of reducing gas needed to operate the direct reduction process.

In some embodiments, the apparatus 100, as indicated above, can include a control unit 68 to control the first injection means 49a for the stream F2, and possibly one and/or the other of other injection means 49b, 49c provided for the streams F3, F4 as described in detail below. The control unit 68 regulates at least the flow rate of the fresh reducing gas stream F3 so as to maintain the sum of the heat provided by stream F2 plus the heat provided by stream F3 within a predetermined range of values so as to maintain the operating conditions of the reduction zone 12 of the reactor 10 to produce DRI at a predetermined production rate. In some embodiments, the control unit 68 additionally to regulating the flow rate of fresh reducing gas stream F2 also regulates the flow rate of fresh reducing gas stream F4.

In some embodiments, the first injection means 49a are connected at exit from the heater 42. The heater 42 receives the stream F2 from an entry pipe 29 associated with a source 46 of reducing gas. A by-pass branch 60a is advantageously associated with the pipe 29 and with the first injection means 49a, in order to allow to by-pass at least the feed of a part of the second stream F2 of fresh reducing gas to the heater 42 and inject it, instead, directly into the first injection means 49a.

In a possible embodiment, the apparatus 100 comprises, as mentioned above, other one or more injection means 49b, 49c configured to inject into the reducing gas circuit 20 at least the stream F3, F4 of fresh reducing gas which amounts to the portion of reducing gas not injected into the reducing gas circuit 20 by the second stream F2.

In a possible embodiment, injection means 49b are provided configured to inject the stream F3 in correspondence with any portion whatsoever of the reducing gas circuit 20 located between the carbon dioxide removal unit 38 and the reducing gas heater 42. According to some embodiments, a source 44 of reducing gas, associated with the injection means 49b, can be provided to supply the stream F3 of fresh reducing gas.

In another possible embodiment, injection means 49c are provided configured to feed the stream F4 directly into the reactor 10. According to some embodiments, a source 48 of reducing gas, associated with the injection means 49c, can be provided to supply the stream F4 of fresh reducing gas.

In further embodiments, it can be provided that both the injection means 49b and also the injection means 49c are present, in order to feed a combination of reducing gas which amounts to the portion of reducing gas not injected by the stream F2, formed by the stream F3 injected in correspondence with any portion whatsoever of the reducing gas circuit 20 located between the carbon dioxide removal unit 38 and the reducing gas heater 42, and by the stream F4 injected directly into the reactor 10.

In one embodiment, the reduction reactor 10 is of the gravitational type.

In one embodiment, the reduction reactor 10 comprises a reduction zone 12, inside which the iron ore reduction processes occur, feeding means 16 to feed iron ore 15 into the reactor 10, an aperture 13 to extract spent reducing gas and a discharge zone 14 to discharge reduced iron 18.

In one embodiment, the reducing gas circuit 20 is configured to regenerate the spent reducing gas exiting the reactor 10 and re-inject it into the reactor 10 once it has been regenerated.

In one embodiment, the apparatus 100 comprises:
devices 32, 34, 36, 40 for regenerating the spent reducing gas,
the source 44 of reducing gas connected to the reducing gas circuit 20 before the heater 42,
a suitable source 52 of oxygen connected to the reducing gas circuit 20 between the heater 42 and the reactor 10,
the source 46 of reducing gas connected between the heater 42 and the source 52 of oxygen,
the source 48 of reducing gas connected directly to the reactor 10;
a valve 56 disposed on the injection means 49b, a valve 58 disposed on the entry pipe 29, a valve 60 disposed on the by-pass branch 60a, and a valve 62 disposed on the injection means 49c;
the at least one control unit 68, which can be connected to at least one of the valves 56, 58, 60, 62 and configured to regulate the respective streams F2, F3, F4 in response to signals emitted by the flowrate sensors 69, 70.

In other embodiments (not shown), the at least one control unit 68 may be connected to the source 52 of oxygen and configured to regulate its flowrate.

According to some embodiments, the stream F1 of spent reducing gas exiting the reactor 10 can be injected into the reducing gas circuit 20 by means of an aperture 13 connected to the reducing gas circuit 20.

In particular, the stream F1 of spent reducing gas reaches, by means of a pipe 21, a heat exchanger 32 suitable to reduce the temperature of the gas.

The cooled reducing gas can be sent to a cooling tower 34 by means of a pipe 22. In the cooling tower 34, the gas is further cooled and is substantially deprived of the water component.

The water extracted from the gas by the cooling tower 34 can be conveyed in a pipe 25, by means of pumping means 66, in order to be reused in subsequent gas treatments described below, in particular to be transferred to a humidifier 40 described below.

Possible inert gases present in the spent reducing gas, and therefore not useful for the reduction processes, can be extracted from the reducing gas circuit 20 through a pipe 23 on which a vent valve 54 is disposed, to control the pressure of the circuit.

According to some embodiments, the inert gases exiting the vent valve 54 can possibly be reinjected into the reducing gas circuit 20 to participate in other functions as described below.

The reducing gas which remains inside the reducing gas circuit 20, which is not extracted through the vent valve 54, is directly fed through a pipe 24 connected to the pipe 23, to a pumping means 64.

The gas exiting from the pumping means through the pipe 24 is sent to a cooler 36, configured to decrease the temperature of the gas.

In some embodiments, the reducing gas circuit 20 of the reduction apparatus 100 described here comprises at least the carbon dioxide removal unit 38 configured to remove $CO_2$ from the reducing gas.

According to some embodiments, the carbon dioxide removal unit 38 is located downstream of the cooler 36 and connected to it by means of a pipe 26.

According to some embodiments, the carbon dioxide removal unit 38 can be of the chemical absorption type where the $CO_2$ is absorbed by a solvent, for example, amines or potassium carbonate.

According to other embodiments, the carbon dioxide removal unit 38 can be of the physical adsorption type where the $CO_2$ is adsorbed by a solid substrate.

In preferred embodiments, the carbon dioxide removal unit 38 can be disposed at a point of the reducing gas circuit 20 so that it receives the reducing gas which has been treated by the treatment devices 32, 34, 36.

In accordance with further embodiments, the carbon dioxide removal unit 38 can be disposed before the spent reducing gas is mixed with fresh reducing gas.

The reducing gas purified of the $CO_2$, or process gas, exits from the device 38 through a pipe 27 to reach the humidifier 40.

Some embodiments provide that in correspondence with the pipe 27, the source 44 of reducing gas suitable to inject the stream F3 of fresh reducing gas into the circuit can be connected through the injection means 49b.

The possible injection of fresh reducing gas of the stream F3 and its volume can be controlled by the valve 56 which controls the flowrate toward the pipe 27.

The process gas exiting from the carbon dioxide removal unit 38, possibly mixed with reducing gas coming from the stream F3, can reach the humidifier 40 in which the percentage of water in the gas can be increased up to a desired value by means of the direct contact of the gas with hot water.

According to some embodiments, the humidifier 40 can use, for its function, the water extracted by the cooling tower 34, which is connected to the humidifier 40 by means of a pipe 25 provided with the pumping means 66.

The humidified gas reaches, by means of a pipe 28, the heater 42 in which it is heated, for example up to a temperature comprised between 800° C. and 1000° C.

The heater 42 functions by burning a suitable fuel introduced into the heater 42 by a supply source 50.

According to some embodiments, the suitable fuel can be fresh reducing gas, reducing gas extracted by the vent valve 54 or a combination thereof.

According to some embodiments, the vent valve 54 can then be connected to the fuel supply source 50.

Some embodiments provide that the source 46 of fresh reducing gas is connected to a convective zone 43 of the heater 42 through the entry pipe 29. According to some embodiments, the pipe 29 can divide following a path external to the convective zone of the heater 42 by means of the by-pass branch 60a.

In accordance with some embodiments, the source 46 of fresh reducing gas or heavy hydrocarbon gases is connected to the reducing gas circuit 20 between the heater 42 and the reactor 10 by the injection means 49a.

Some embodiments can provide that the valve 58 and/or the valve 60 are able to direct and control the second stream F2 toward the heater 42, in particular the respective convective zone 43.

In particular, the valve 58 is used to control the overall stream F2, while the valve 60, disposed on the by-pass branch 60a, is used to vary the quantity of reducing gas that is injected into the heater 42.

Advantageously, the pre-heating allows to inject into the reducing gas circuit 20 reducing gas that is sufficiently hot for the subsequent steps, so as to minimize the temperature drop resulting from the mixing of the fresh reducing gas with the reducing gas coming from the heater 42.

According to some embodiments, between the injection means 49a and the reactor 10, the source 52 of oxygen can be provided, configured to inject oxygen so as to increase the temperature of the incoming gas up to a temperature level comprised between 950° C. and 1150° C. This injection of oxygen also allows to compensate for the temperature loss caused by mixing the fresh reducing gas, cold or pre-heated, with the reducing gas coming from the heater 42.

The regenerated gas can then be injected into the reactor 10.

It is clear that modifications and/or additions of parts or steps may be made to the apparatus for the direct reduction and its corresponding method as described heretofore, without departing from the field and scope of the present invention.

It is also clear that, although the present invention has been described with reference to some specific examples, a person of skill in the art shall certainly be able to achieve many other equivalent forms of plants for direct reduction, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A method for producing DRI in a direct reduction process using a reducing gas selected from a natural gas having more than 4% by volume of total hydrocarbons heavier than methane, coke oven gas (COG) having complex carbon compounds (BTX), or other synthetic gases coming from any source with a content of $CH_4$ and heavy hydrocarbons, wherein said method comprises circulating a first stream (F1) of reducing gas exiting a reduction reactor (10) in a reducing gas circuit (20) through at least one carbon dioxide removal unit (38), a reducing gas heater (42) and said reduction reactor (10); and feeding, into said reducing gas circuit (20), between said reducing gas heater (42) and said reduction reactor (10), a stream (F2) of fresh reducing gas, feeding at least one further stream (F3, F4) of fresh reducing gas into said reducing gas circuit (20) wherein a flow rate of said stream (F2) of fresh reducing gas is more than 20% by volume of a sum of the flow rate of said stream (F2) plus a flow rate of said at least one further stream (F3, F4) of fresh reducing gas, wherein said method does not comprise any step of removal of hydrocarbons heavier than methane from the fresh reducing gas streams (F3, F4) fed into the reducing gas circuit (20).

2. The method as in claim 1, wherein said gas stream (F2) is pre-heated to a temperature lower than 650° C.

3. The method as in claim 2, wherein said stream (F2) is pre-heated in a convective zone (43) of said reducing gas heater (42).

4. The method as in claim 2, wherein said stream (F2) is pre-heated in a heat exchanger or fired heater separated from said reducing gas heater (42).

5. The method as in claim 1, wherein said stream (F2) is injected into the reducing gas circuit (20) without being pre-heated.

6. The method as in claim 1, wherein said further stream (F3) of fresh reducing gas is injected at a point of the reducing gas circuit (20) located between said carbon dioxide removal unit (38) and said reducing gas heater (42).

7. The method as in claim 1, wherein said further stream (F4) of fresh reducing gas is injected directly into the reactor (10).

8. The method as in claim 1, wherein the flow rate of at least the stream (F2) is controlled by at least one control unit (68) that regulates the flow rate and therefore the percentage of fresh reducing gas injected into the circuit (20).

9. The method according to claim 8, wherein said control unit (68) regulates the flow rate of said gas stream (F2) in response to a signal emitted by a flow rate sensor (69, 70) measuring the flow rate of gas stream (F3) and/or (F4).

10. The method as in claim 8, wherein said control unit (68) additionally to regulating the flow rate of said gas stream (F2) also regulates the flow rate of gas stream (F3) and/or (F4).

11. The method as in claim 8, wherein said control unit (68) regulates at least the flow rate of the stream (F3) so as to maintain the sum of heat provided by stream (F2) plus heat provided by stream (F3) at a temperature high enough to maintain a total amount of energy necessary to carry out a reduction reaction in a reduction zone (12) of the reactor (10) according to a programmed DRI production rate of the reactor.

12. The method as in claim 8, wherein said control unit (68) also regulates a flow rate of oxygen (52) to increase a temperature of a fresh reducing incoming gas stream (F2) and maintain a temperature in reducing gas heater (42) to compensate for temperature loss upon mixing the fresh reducing incoming gas stream (F2) with reducing gas coming from the reducing gas heater (42).

* * * * *